United States Patent [19]
Newton et al.

[11] Patent Number: 4,557,552
[45] Date of Patent: Dec. 10, 1985

[54] MICROBEND OPTICAL FIBER TAPPED DELAY LINE

[75] Inventors: Steven A. Newton, Menlo Park; Cassius C. Cutler, Palo Alto, both of Calif.

[73] Assignee: Board of Trustees of the Leland Stanford Junior University, Stanford, Calif.

[21] Appl. No.: 323,037

[22] Filed: Nov. 19, 1981

[51] Int. Cl.[4] .............................................. G02B 5/172
[52] U.S. Cl. ................................. 350/96.15; 250/227; 350/96.19
[58] Field of Search ...................... 250/227; 350/96.15, 350/96.16, 96.19, 96.20

[56] References Cited
U.S. PATENT DOCUMENTS

| | | | |
|---|---|---|---|
| 3,936,631 | 2/1976 | Muska | 350/96.15 |
| 3,982,123 | 9/1976 | Goell et al. | 350/96.15 X |
| 4,019,051 | 4/1977 | Miller | 350/96.15 |
| 4,076,375 | 2/1978 | Muska et al. | 350/96.15 |
| 4,125,768 | 11/1978 | Jackson et al. | 350/96.15 X |
| 4,136,929 | 1/1979 | Suzaki | 350/96.15 |
| 4,159,418 | 6/1979 | Marom | |
| 4,270,839 | 6/1981 | Cross | 350/96.15 |
| 4,277,134 | 7/1981 | Upton, Jr. | 350/96.20 |
| 4,296,319 | 10/1981 | Franks et al. | 350/96.15 X |
| 4,314,740 | 2/1982 | Bickel | 350/96.15 |
| 4,342,499 | 8/1982 | Hicks, Jr. | 350/96.15 |

FOREIGN PATENT DOCUMENTS

| | | |
|---|---|---|
| 2409455 | 9/1975 | Fed. Rep. of Germany . |
| 3008051 | 9/1981 | Fed. Rep. of Germany . |
| 1420458 | 1/1976 | United Kingdom ............. 350/96.15 |

OTHER PUBLICATIONS

*Fiber Optics*, by B. Bendow and S. Mitra, Plenum Press, New York, 1979, pp. 616–622.
*Optical Fibers for Transmission*, by John E. Midwinter, John Wiley and Sons, New York, 1979, pp. 8–9.
*Introduction to Optical Fiber Communications*, by Y. Suenatsu and K. Iga, John Wiley and Sons, New York, 1982, pp. 50–51, 114–115, and 136–137.
Chang, C. T. et al., "Fibre-Optic Delay-Line Devices for R. F. Signal Processing", *Electronics Letters*, vol. 13, No. 22, Oct. 1977, pp. 670–680.
Marom, *IEEE Transactions on Circuits and Systems*, vol. CAS-25, No. 6, Jun. 1978, "Optical Delay Line Matched Filters", pp. 360–364.
Alferness et al., *IEEE J. of Quantum Electronics*, vol. QE-14, No. 11, Nov. 1978, "Filter Characteristics of Codirectionally Coupled Waveguides with Weighted Coupling," pp. 843–847.

*Primary Examiner*—William L. Sikes
*Assistant Examiner*—Frank González
*Attorney, Agent, or Firm*—Knobbe, Martens, Olson & Bear

[57] ABSTRACT

A fiber optic tapped delay line is disclosed in which a number of bends in a single optical fiber are formed to obtain taps of an optical signal traveling in that fiber at each bend location. Light removed at the bends is directed to a focusing lens, which focuses the light onto a photodetector acting as a summing device to produce a frequency-filtered output of the light signal traveling in the fiber. The device's response as a transversal filter is enhanced by weighting the taps either by use of a cylindrical lens, or by selectively masking a portion of light emitted by selected individual taps.

27 Claims, 7 Drawing Figures

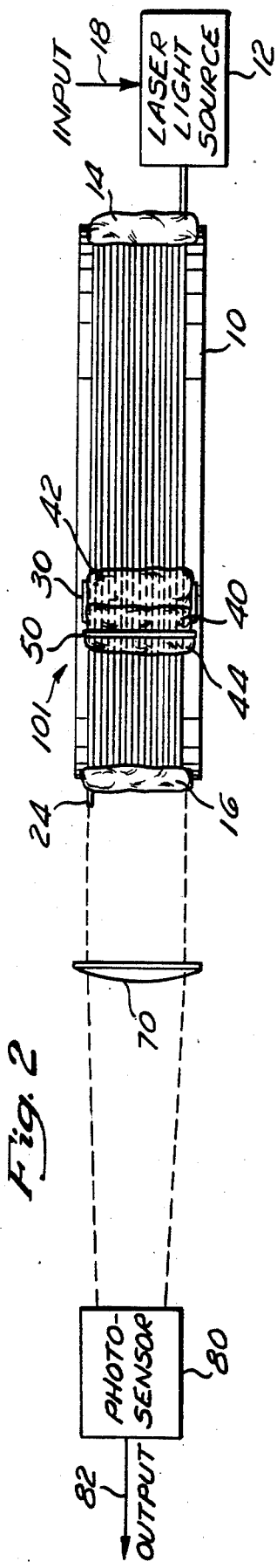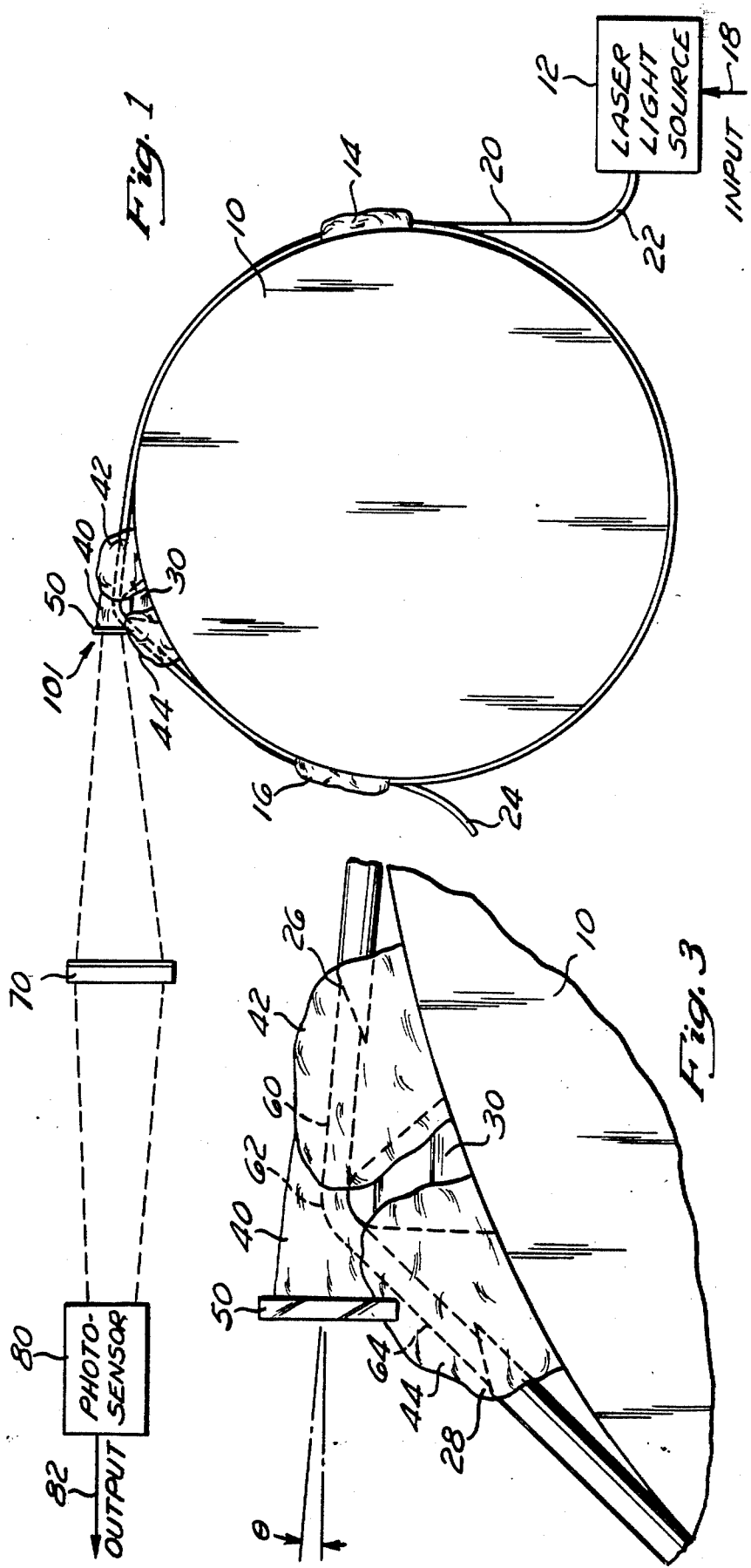

MICROBEND OPTICAL FIBER TAPPED DELAY LINE

BACKGROUND OF THE INVENTION

In communication and control systems, delay lines are used to store a signal for a discrete period, and to supply that signal at an output point at the end of the period. This period between the time the signal is input and the time the signal is output is called the delay time. A tapped delay line is a variation in which the signal is supplied at several different output points, the distance between successive output points being that distance which will provide a delay time equal to the period of the fundamental frequency of the device. Tapped delay line applications include use in correlating and convoluting devices.

If an input signal which varies as some function of time is supplied to the input of the tapped delay line, the tapped delay line may be used to filter selected frequencies from the input signal. By summing the outputs of the tapped delay line, the device will attenuate any input signal content other than of the fundamental frequency, or that fundamental frequency's harmonics.

For example, by making the period between the several output points five microseconds, a fundamental frequency having a five microsecond period will be provided at the summed output, along with the various harmonics of that fundamental frequency. For the five microsecond period, the fundamental frequency would be 200 KHz. When a tapped delay line is used in this way to pass some frequencies and reject others, it is acting as a transversal filter.

There are three basic types of delay lines which may act as transversal filters. The first type comprises a group of devices utilizing wave phenomena in which waves may reinforce to cause the device to act as a transversal filter. The second type utilizes a considerable length of transmission medium with the signal being removed at taps which are separated by equal lengths of the transmission media, these signals then being summed to provide the desired system output. The third type of system recirculates the signal to allow the desired fundamental and harmonic frequencies to reinforce themselves, with the resulting output being in effect already summed by the recirculating action.

The first group are those devices utilizing wave phenomena to obtain a similar output. Many of these devices use coaxial cables or acoustic wave guides for the transmission and summation of signals. The time delay in these devices is produced because of the time a signal takes to travel through the delay line from the input end to the output end. Portions of the signal will be reflected and will propagate from the output end back to the input end, where they are reflected to the output end again. Where an input function is continuously supplied, these devices will reinforce the signal at some fundamental frequency and that frequency's harmonics, while attenuating all other frequencies, and will provide at the output end a signal comprising the fundamental and harmonic frequency content of the input signal.

The coaxial cable delay line is the most common of these devices, and microwave signals may be stored in coaxial cables for some period of time. The main disadvantage of coaxial cables is that they have a fairly limited bandwidth, making coaxial cable useless at high frequencies and with short pulses.

At frequencies above 100 MHz, coaxial cable is subject to severe loses, and high frequencies will thus not be transmitted accurately. In addition, if the pulse being transmitted is of extremely short duration, e.g., one nanosecond, it will be degraded and spread out rather than remaining sharp.

Coaxial cable is also susceptible to electromagnetic interference, particularly when the frequencies being transmitted are relatively high. Finally, fairly long lengths of coaxial cable may be necessary to allow the device to function as a transversal filter at lower frequencies, and such devices are quite bulky and also fairly expensive.

Another type of device utilizing wave phenomena is the acoustic delay line device. There are two types of acoustic delay lines: bulk-wave devices, and surface-wave devices. Bulk-wave devices use the principle of compression and rarefication of the bulk material, and have input and output transducers at the ends of the bulk material. Bulk-wave devices, unfortunately, require large bias voltages and thus present a heat dissipation problem, so that only pulsed operation of bulk-wave devices is feasible.

Surface-wave devices operate with acoustic surface waves, and utilize charge carriers in a thin film of silicon placed adjacent to an insulating piezoelectric crystal. Surface acoustic wave devices operating at UHF frequencies have been developed and operate with multiple taps installed in the transmission medium. The main disadvantage of such devices is that their upper operational frequency limit is approximately one GHz, and it is desirable to have a transversal filter which is operable at higher frequencies. Therefore, it can be seen that devices utilizing wave phenomena are not very satisfactory when used as transversal filters at high frequencies.

Tapped delay lines having a number of taps at different lengths of the transmission medium are generally of two types: electrical, and optical fiber. The electric tapped delay line is simply a long segment of wire with outputs at multiple points along this wire. The fundamental frequency of such a tapped delay line is selected by a uniform length of wire between outputs, the time an electrical impulse takes to travel from one output to the next such output being the period of the fundamental frequency. Such devices are fairly bulky and expensive, since the requirement of having hundreds or possibly even thousands of outputs means that fairly large lengths or wire will be needed. Such devices also have a severe limitation in their operational bandwidth, and are generally not operable at high frequencies or in an environment having a not insubstantial amount of electromagnetic interference.

The optical fiber type of tapped delay line has significant advantages in that it is not susceptible to electromagnetic interference, is operable at relatively high frequencies, and optical fiber is substantially less bulky than wire. However, in order to obtain performance over a wide range of frequencies from existing optical fiber devices, hundreds or even thousands of optical taps must be utilized. This can be done with current technology by fabricating discrete couplers at each tapping point. Such a system is not really feasible in that it is extremely difficult to construct, quite expensive, and would be difficult to accomplish without lowering the signal level substantially. However, the concept of sampling the signals in an optical fiber at discrete intervals is an important one, and will be utilized by the present invention.

Another type of optical fiber tapped delay line is one which uses multiple segments of optical fiber, each segment being a standard length longer than the preceding segment, the standard length being the length through which light travels in one period of the fundamental frequency. The signal being analyzed is introduced into these segments simultaneously, and the outputs of each of these segments is summed to produce an output signal comprising the fundamental and harmonic frequency content of the input signal.

While this device accomplishes the desired result, it presents the substantial problem of necessitating an input signal to be simultaneously supplied to hundreds or even thousands of optical fiber segments. Such a device would be difficult to construct, and would also be somewhat bulky.

Each of the above optical fiber devices also presents the disadvantage of not being able to change the tap weighting dynamically without extensive modifications to the device. In other words, once such a device is constructed, the relative weighting of various outputs which are to be summed may not be changed in order to tailor the output signal of the device.

The second type of tapped delay line is a recirculating memory type device, such as that described in co-pending U.S. Pat. Application Ser. No. 314,473, filed Oct. 23, 1981, entitled "Splice Free Fiber Optic Recirculating Memory," and assigned to the assignee of the present invention. Such device operates in a way quite similar to the wave phenomena devices described above—a signal recirculates through a fiber optic loop in the recirculating memory devices, with the output of the device being a summed signal comprising the system-set fundamental and harmonic frequency content of the input signal, with all other frequencies being attenuated. The fundamental frequency has a period equal to the time taken for a signal to make one circulation through the loop.

Such devices have the advantages of being operable at high frequencies, being unaffected by electromagnetic interference, and being fairly compact. However, when used as a transversal filter, such devices have several disadvantages. First, in order to obtain an output signal of a usable level, recirculating memory devices can only provide a fairly limited number of circulations before the signal level drops below the usable level. This is a particular problem since it is desirable to have hundreds or even thousands of points at which the signal is taken and summed in order to obtain an accurate and sharply defined passband. A second substantial disadvantage of such devices is that there is no way to change the dynamic weighting of the output signals taken at various points before they are summed, since the summing is done within the device. Finally, since recirculating memory devices have a fixed loop length, there is a limitation on the length of signals input to such devices.

Therefore, there is a need for a device which has a large number of discrete taps, each tap being capable of removing the signal at some discrete point in the delay line. Each of the tapped outputs should be discrete, so that dynamic weighing of the outputs may be accomplished in order to tailor the resulting output of the system when the signals are summed. For example, by weighting the various output signals, a more nearly rectangular band for a transversal filter may then be obtained.

SUMMARY OF THE INVENTION

The invention is a tapped delay line utilizing sharp bends in an optical fiber to cause a portion of the light traveling as a core mode in the fiber to be transferred from the core to the cladding of the fiber where both cladding modes and radiation modes are initiated. Light propagating as radiation modes is removed from the fiber by surrounding the cladding with an index matching medium which will allow light to propagate from the cladding onto the index matching medium. The single mode optical fiber preferred is commercially avaliable quartz glass fiber, which is doped to have a central core and an outer cladding. The core generally has a high index of refraction, while the cladding has a low index of refraction. Thus, light properly introduced to the fiber will travel in a single mode, most of which is in the core. The portion of light not traveling in the core is called the evanescent field. If the cores of two fibers are brought into close proximity, the propagating mode of the light may change, allowing light to be coupled from one fiber to another, as in co-pending U.S. Patent Application Ser. No. 300,955, filed Sept. 10, 1981, entitled "Fiber Optic Directional Coupler," which is assigned to the asignee of the present invention, and is hereby incorporated herein by reference. In the present invention, however, such close core proximity is not present, and thus most of the light travels in a mode within the core.

A length of glass fiber is wound around two forms: a first form of a diameter sufficiently large to prevent severe bending and the accompanying loss of light from the core of the glass fiber, and a second form abutting the first form, the second form being of a diameter small enough to cause a severe bend in the glass fiber. At the location of this severe bend, a small portion of the light traveling as the core mode propagates into the cladding. A number of turns of the glass fiber are helically wound around these two forms, the revolutions of fiber being in an adjoining but not overlapping configuration.

Since there are a number of turns of the glass fiber wrapped around the two forms, a portion of the signal traveling in the glass fiber will be removed from the core of the glass fiber at each point the glass fiber is sharply bent over the second form. In this way, an input signal supplied to the fiber will be sampled at equal intervals of time, the interval being equal to the time a light signal takes to propagate through one revolution of glass fiber. Therefore, the number of taps in the tapped delay line is equal to the number of revolutions of the glass fiber around the two forms.

The radiation mode light removed from the core mode at each of the tap points is propagated into the cladding at each of the tap points, and must be removed from the cladding. An index matching medium applied to the cladding of all of the windings at the beginning of the sharp bend is used to cause the radiation mode light tapped from the core mode into the cladding to leave the cladding at this point. A glass slide abutting the index matching medium is used to cause the light leaving the cladding of all of the windings through the index matching medium to be directed in a beam orthogonal to the glass slide.

The beam of light is directed to a focusing lens, which focuses the light into a photosensor. The focusing lens and photosensor together act on the beam of light as a summing device, in effect simultaneously summing the outputs of each of the taps of the optical fiber. When an input signal is supplied to one end of the fiber and the beam of light is focused into the photosensor and summed, the resulting system output will be a signal comprising the system-set fundamental and harmonic frequency content of the input signal. The fundamental frequency of the system is set by the circumference of the optical fiber around the two forms, that circumference providing some fixed delay time equal to the period of the desired fundamental frequency.

As a result of the sharp bend, some light propagated into the cladding remains as cladding modes. Such cladding mode light may be removed at a succeeding tap as a radiation mode, resulting in an erroneous signal being tapped out of the fiber at that next tap. To prevent this, an additional segment of index matching medium is used to remove from the cladding light remaining in the cladding after the optical tap and propagating in the cladding as a cladding mode.

An additional feature of the invention is that the response of the tapped delay line may be weighted by changing the shape of the focusing lens. The preferred embodiment uses a cylindrical lens to obtain a close approximation of a rectangular wave bandpass filter.

The advantage of the present invention over tapped delay lines utilizing wave phenomena and electrical propagation techniques is that the use of optical fiber allows signals of much higher frequencies to be utilized. An alternative embodiment of the invention utilizes multiple tapping locations around the circumference of the device, and the frequencies which may be detected are increased by a factor equal to the number of tap assemblies in the device.

Another advantage of the present invention is that since it uses optical fiber, it is not susceptible to electromagnetic interference. Since the taps are obtained at a single point (or at multiple points for the alternative embodiment) around the central core, the invention is quite compact. Rather than utilizing multiple lengths of optical fiber, only a single length of optical fiber is necessary. This has the effect of making the device of the present invention more compact, easy to manufacture, and cheaper than past optical tapped delay lines.

Since the manufacture of a tap requires only the formation of a number of sharp bends in the optical fiber, the taps are considerably easier to manufacture than prior optical taps. In addition, the uniformity of the taps will be very precise since no cutting or alignment of fibers is necessary with a microbend tap device. Since it is not necessary to physically invade the cladding of the optical fiber, the likelihood of damaging the optical fiber or weakening it substantially are minimized. In addition, since each optical tap of this device removes only a very small portion of the signal traveling in the fiber, a large number of taps are possible with this invention.

These and other advantages of the present invention are best understood through reference to the drawings, in which:

FIG. 1 is a side view of the preferred embodiment of the invention, including a cylindrical lens producing a weighted response;

FIG. 2 is a top view of the invention as shown in FIG. 1, illustrating how the fiber is wound around the cores;

FIG. 3 is an enlarged view of the tap area shown in FIG. 1, illustrating the portion of the optical fiber where the jacket is removed, the various portions of index matching medium, and the alignment of the glass slide;

DETAILED DESCRIPTION OF THE PREFERRED EMBODIMENT

Figure 4:
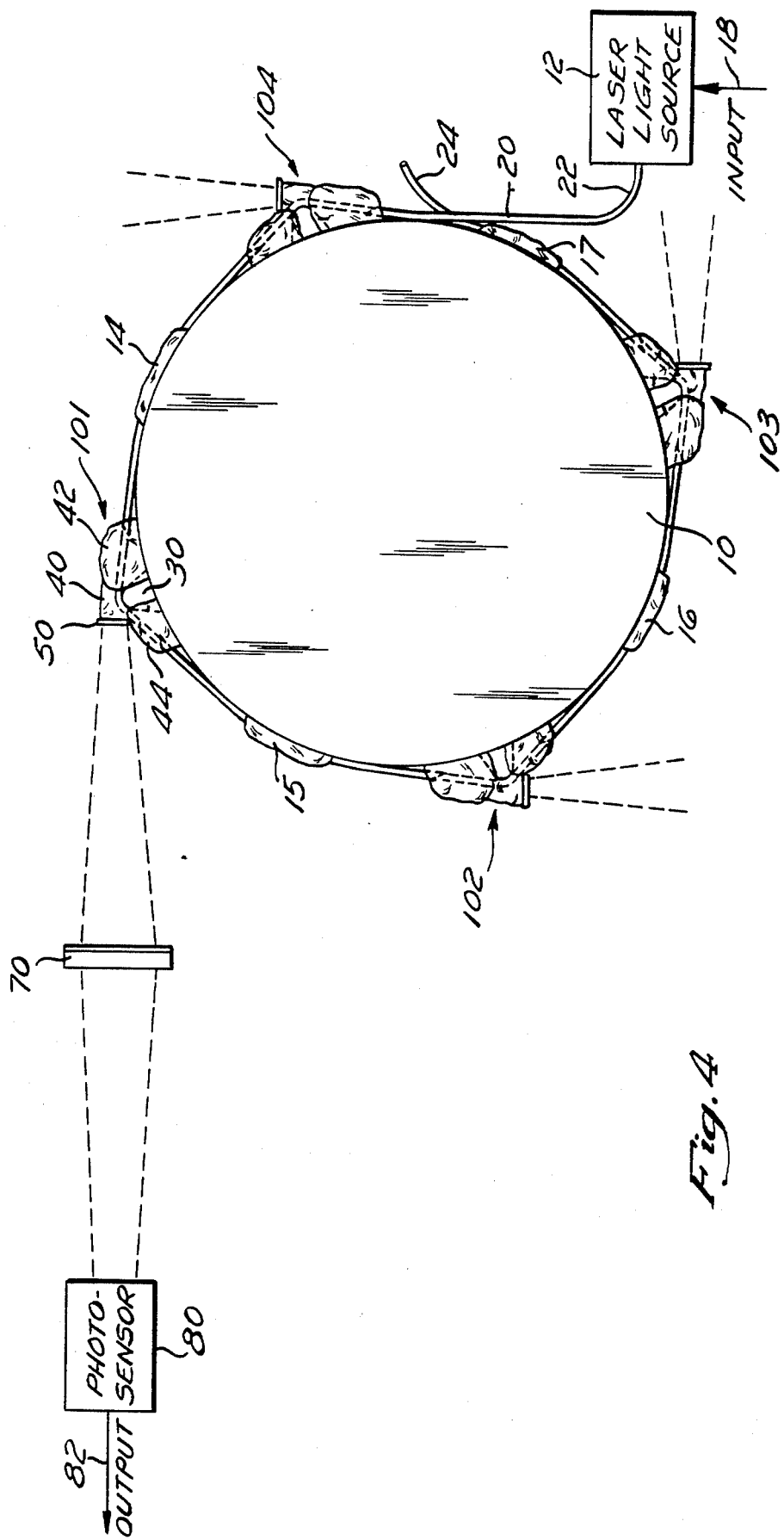
FIG. 4 is an alternative embodiment of the present invention in which taps are located at multiple points around the central core, to allow a higher frequency response.

In this invention, a number of optical taps are simultaneously fabricated from a single fiber helically wound into a number of abutting but not overlapping windings around a form. To that extent, the approach taken by this invention is similar to that in co-pending U.S. Patent Application Ser. No. 323,038, filed simultaneously with this application, entitled "Tapped Optical Fiber Delay Line," and assigned to the assignee of the present invention. That co-pending patent application is hereby incorporated herein by reference.

In this invention the optical taps are created by microbends, that is by utilizing a sharp bend in the optical fiber to cause a portion of the light traveling as a core mode to be propagated into the cladding of the fiber as cladding modes and radiation modes, where light traveling in these modes may be removed. An advantage of this approach is the creation of multiple taps in a length of optical fiber without having to cut into the cladding of the fiber. Since the cladding of the fiber is not cut, the mechanical integrity of the taps is not degraded.

In FIG. 1, the preferred embodiment of the present invention is shown. A first form 10 and a second form 30 are used as a form to wind a length of glass fiber 20 around. The first form 10 is of sufficient diameter to prevent bending losses from occurring in the fiber 20 when it is wrapped around the first form 10. The second form 30 is fairly small, and abuts the first form 10 so that when the glass fiber 20 is wrapped around the first and second forms 10, 30, it will be bent at a point directly over the second form 30.

The second form 30 may be a small dowel of about three-eighths inch diameter. However, it has been found that in order to keep the ray of light tapped out of the fiber 20 as narrow as possible, it is desirable to have a second form 30 with a fairly low profile, although of sufficient height to cause a bend in the optical fiber 20 of a degree that will initiate the propagation of light from the core (not shown) of the fiber 20 into the cladding. Therefore, the second form 30 is preferably of the triangular shape shown with a rounded tip to prevent damage to the optical fiber 20.

Of the single-mode optical fiber which is being used, the two most common types are the ITT fiber, which has a cladding diameter of about 80 microns and is covered by an external plastic jacket with an outer diameter of 400 microns, or a Corning fiber which has a cladding diameter of about 125 microns and a lacquer jacket which has an outer diameter of 135 microns. The ITT fiber, which is generally easier to handle, is single mode at visible light wavelengths (longer than green), and the Corning fiber is single mode at infrared wavelengths. The fiber used thus depends on the operating wavelength of the device. In the preferred embodiment, the ITT fiber is utilized, and the drawings thusly depict the use of the ITT fiber.

The optical fiber 20 originates at point 22, and is then helically wrapped around the forms 10, 30 with a number of abutting but not overlapping windings, as best shown in FIG. 2. The forms 10, 30 may be of various widths to accommodate various numbers of windings. After the optical fiber 20 is wound around the forms 10, 30, wax or some other adhesive may be used to hold the optical fiber 22 in place on the form 10; this wax 14, 16 is shown in FIGS. 1 and 2.

If the ITT fiber is being utilized, the plastic jacket surrounding and protecting the cladding and core of the fiber should be removed, since the plastic jacket will prevent the propagation of light from the optical fiber 20. The preferred way to remove this jacket is to first wind the optical fiber 20 on the forms 10, 30, and next to dip the portion of the optical fiber from which the jacket is to be removed into sulfuric acid, which will remove the plastic jacket but will not harm the glass fiber. In FIG. 3, it can be seen that the portions of the jacket extend around the form 10 to the points 26, 28, and have been removed between these points by dipping in the acid.

If the Corning fiber is being utilized, it is not necessary to remove the lacquer jacket surrounding the fiber, since the thin lacquer coating is translucent. If the lacquer jacket is to be removed, the procedure is the same as for the ITT fiber, except that acetone is used instead of sulfuric acid.

It is desirable to remove only a fairly small amount of light at each tap location, for example, between 1 percent and 0.1 percent of the light traveling in the fiber. The technique of tapping light out of the fiber 20 at bends is ideally suited to this application. The exact amount of light leaving the core mode at the bend will be determined by the length and the radius of the bend. Generally, the smaller the radius of the bend, and the longer the length of fiber 20 bent in the small radius, the greater will be the amount of light leaving the core mode.

An input signal 18 is supplied to a laser light source 12, where the input signal 18 will be modulated onto a light signal supplied to the input end 22 of the optical fiber 20. The light will travel through the device in FIG. 1 in a counter clockwise direction, exiting the fiber 20 at the fiber exit 24 after being detected at the tap location 101 upon each circulation of light around the forms 10, 30.

An index matching medium 40 is used to allow the light propagating from the core mode to the cladding as radiation modes to leave the cladding of the optical fiber 20 at the bend location 62. A glass slide 50 in contact with the index matching medium 40 determines the angle at which a beam of light leaving the optical fiber 20 at the bend area 62 will be aimed, the direction of the beam being orthogonal to the glass slide 50. It may be seen that the beam orthogonal to the glass slide 50 is at an angle theta counter-clockwise from a tangent drawn from the input portion 60 of the glass fiber 20. This angle theta is generally less than 10 degrees, and the exact angle depends on the size of the forms 10, 30. The size of the forms 10, 30 thus determine the radius and the length of the bend area 62, which determine the amount of light tapped out and the angle at which the light will leave the fiber 20.

The beam of light projecting from the glass slide 50 is directed to a focusing lens 70, which focuses the beam of light on a photosensor 80. The photosensor 80 acts as a summing device in that it will monitor the time varying intensity of the light emitted from all of the taps at the tap location 101. The output 82 of the photosensor 80 is a signal comprising the system-set fundamental and harmonic frequency content of the input signal, other frequencies having been attenuated by the summing of the outputs of the taps. The device therefore acts as a transversal filter to pass some frequency, the fundamental frequency passed being determined by the length of fiber contained in one circumference of the forms 10, 30.

A portion of the light propagating from the core to the cladding of the optical fiber 20 at the bend location 62 is not removed by the index matching medium 40 but continues to propagate through the cladding as cladding modes. These cladding modes would continue in the optical fiber 20 to the next succeeding tap, at which point portions of them could be removed by the indexing medium 40, causing interference with the primary signal desired removed at the next tap.

The use of an index matching medium 42 on the input portion 60 of the optical fiber 20 removes cladding mode light from the cladding of the optical fiber 20, thus preventing it from reaching the bend area 62. The preferred index matching medium 42 must be of the same index as the cladding to prevent reflection back into the cladding. The index matching medium used in this application is ultraviolet glue, which has roughly the same index as the cladding of the glass fiber, and also acts to reinforce the weaker area of the fiber where the plastic jacketing has been removed between the points 26 and 28. A second portion of the ultraviolet glue 44 helps to remove light remaining in the cladding at the output area 64 after the bend location 62, thus helping to remove unwanted cladding modes as well as to reinforce the unjacketed portion of the optical fiber 20. Since the index matching medium 40 may also be ultraviolet glue, the entire area (index matching mediums 40, 42, 44) may be a continuous segment formed by ultraviolet glue, which acts to pot the area of the jacket that has been etched away as well as to provide the required index matching medium characteristics.

The microbend tapped delay line will function at higher frequencies than wave phenomena devices and electrical tapped delay lines. The optical device is also impervious to electromagnetic interference. For the device shown in FIG. 1, the limitation on frequency is the minimum size of the forms 10, 30, the circumference of which provides a fixed delay time equal to the period of the fundamental frequency. Therefore, by making the forms 10, 30 smaller, the frequency response may be increased, so long as the diameter of the form 10 is not small enough to cause light to propagate from the core to the cladding of the fiber 20.

The frequency response may be further increased by utilizing the alternative embodiment of FIG. 4, where multiple tap locations 101, 102, 103, and 104 are used. By utilizing multiple tap locations, the length of the fiber 20 between taps is reduced and the fundamental frequency of the device is increased by a factor equal to the number of tap locations around the circumference of the form 10. For the device shown in FIG. 4, the fundamental frequency is four times that of the device shown in FIG. 1, for the same diameter of the form 10.

The device shown in FIG. 4 includes three additional focusing lenses 70 (not shown) and three additional photosensors 80 (not shown), for the three additional tap locations 102, 103, and 104. The output of the device shown in FIG. 4 is obtained by summing the outputs of the four photosensors 80.

Weighting the outputs of a tapped delay line to vary the response of the system is performed by attenuating to some extent the outputs of selected individual taps. When the device is being used as a transversal filter, the passband may be sharpened and narrowed somewhat to more closely resemble an ideal rectangular passband.

Figure 5:
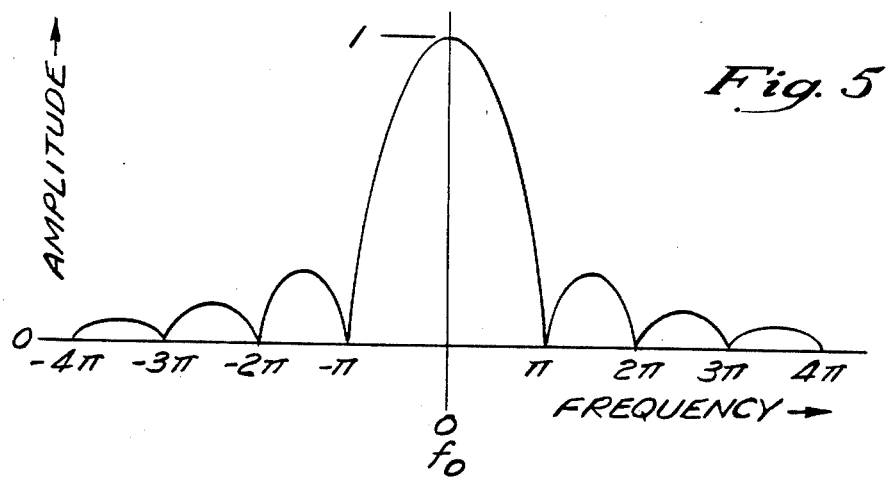
FIG. 5 is a weighting function used to produce a rectangular passband transversal filter.

If the taps are weighted equally (or not weighted at all), the frequency response of the device is $|\sin x/x|$, as shown in FIG. 5. The fundamental frequency is centered at $f_o$, with the passband being between $-\pi$ and $\pi$ from the fundamental frequency $f_o$.

Since it is desirable to obtain a more rectangular passband and to eliminate the side frequency nodes, weighting of the taps is desirable. By weighting the taps of the present invention with a function similar to the $|\sin x/x|$ function shown in FIG. 5, it has been discovered that a more rectangular passband may be obtained.

The outputs of the tapped delay lines may be weighted by using a mask on the glass slide 50 to selectively reduce the intensity of light emitted by various taps, or by changing the shape of the focusing lens 70. By darkening with a mask portions of the glass slide 50, taps propagating light through the darkened portions of the slide 50 will be attenuated to a degree proportional to the light absorbed by the masked portion of the slide 50.

Figure 6:
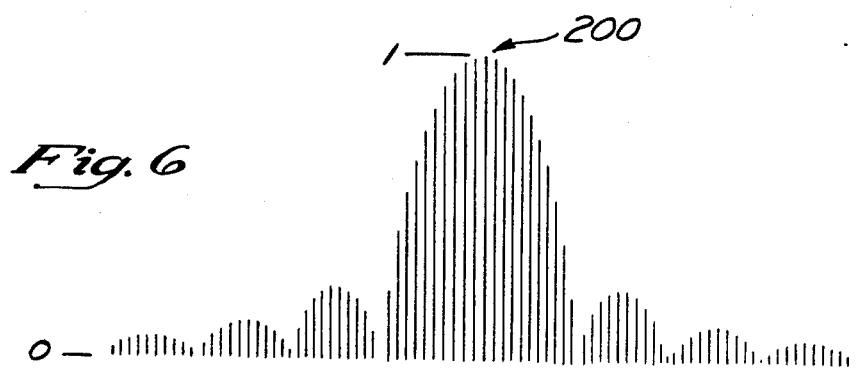
FIG. 6 is a graph of the weighting of a number of taps using the weighting function of FIG. 5.

In FIG. 6, the preferred weighting of a 67-tap tapped delay line using the masking technique is described by a graph showing the weighting of the 67 taps. The center tap 200 is not weighted at all, so all of the light from it is allowed to reach the photosensor 80. The taps to each side of the center tap 200 are weighted by masking a portion of the light emitted from the particular taps to produce the relative light intensity of the taps shown in FIG. 6, with less than 100% of the light emitted from the taps on the sides of the center tap 200 reaching the summing device. This will produce the desired more nearly rectangular passband.

Figure 7:
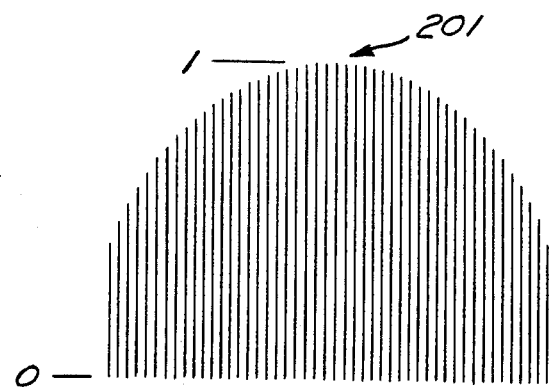
FIG. 7 is a graph of the weighting of a number of taps using a portion of the weighting function of FIG. 5.

The focusing lens 70 shown in FIGS. 1 and 2 is a cylindrical lens which also acts as a weighting device since its angular response will weight the light from taps at different physical locations differently. A cylindrical lens may produce the weighting pattern shown in FIG. 7, with the center tap 201 being the only tap with 100% of the light emitted reaching the photosensor 80. The weighting pattern of FIG. 7 resembles the center portion of the weighting function shown in FIG. 5 since a cylindrical lens will focus light entering away from its center less efficiently than it will focus light entering from the center. The cylindrical lens is used in the preferred embodiment because it produces a somewhat more rectangular passband shape. If different weighting is desired, a different lens would be used. Variations in lens positions may also vary the weighted response of the system.

The present invention, when used as a transversal filter, provides a distinct advantage over recirculating memory devices in several respects. First, since the cladding of the optical fiber need not be physically invaded, the structural integrity of the fiber will be considerably higher. Also, the microbend tapping technique will produce more nearly identical taps. The taps each remove only a very small portion of the light traveling in the optical fiber 20. Therefore, the strength of the optical signal traveling in the fiber at the beginning of the fiber will be only slightly larger than will the strength of the signal traveling near the end of the fiber, even though a large number of taps are present. Another important advantage of the present invention over the recirculating type optical tapped delay lines is that by changing the focusing lens 70, the weighting of the taps may be varied. Indeed, by using a cylindrical lens, the shape of the passband will be more nearly rectangular than will be the shape of the passband of a recirculating type device.

Finally, the present invention is a much simpler and cheaper tapped delay line to manufacture than other types of device described above. The manufacturing technique is fairly simple, since it is not necessary to cut into the cladding of the optical fiber 20. The device is responsive at frequencies up to about 10 GHz, and when used as a transversal filter will provide a well defined output.

What is claimed is:

1. A tapped optical fiber delay line, comprising:
   a length of optical fiber positioned on a form having at least one raised portion, said fiber having first and second segments, each of said first segments passing over a raised portion on the form so as to create a bend of radius sufficiently small to cause a portion of a light signal traveling in said first segments to be directed out of said fiber at said first segments, and any bend radius in said second segments being sufficiently large to prohibit a portion of a light signal traveling in said second segments from being directed out of said fiber at said second segments; and
   means for detecting light directed out of said fiber at said first segments.

2. A tapped optical fiber delay line as defined in claim 1, wherein said means for detecting comprises:
   a photoelectric device for converting light signals directed out of said fiber into electrical signals.

3. A tapped optical fiber delay line as defined in claim 2, wherein said means for detecting additionally comprises:
   a focusing lens to focus light directed out of said fiber into said photoelectric device.

4. A tapped optical fiber delay line as defined in claim 3, wherein said focusing lens is a cylindrical lens.

5. A tapped optical fiber delay line as defined in claim 1, additionally comprising:
   an index matching medium in contact with said bends in said first segments, said index matching medium permitting light directed out of said fiber to be removed from said fiber at the location of said bends.

6. A tapped optical fiber delay line as defined in claim 5, wherein said index matching medium is ultraviolet glue.

7. A tapped optical fiber delay line as defined in claim 5, additionally comprising:
   a glass slide, said slide being in contact with said index matching medium and causing said light directed out of said fiber to be directed in a beam orthogonal to said slide.

8. A tapped optical fiber delay line as defined in claim 7, wherein said slide includes masked portions, said masked portions causing less than the full amount of light emitted from the fiber at any of the bends of the first segments to be directed in said beam.

9. A tapped optical fiber delay line as defined in claim 1, additionally comprising:

an index matching medium in contact with said fiber in said first segments at a location adjacent to said bends in said first segments, said index matching medium removing cladding modes of light from said fiber.

10. A tapped optical fiber delay line as defined in claim 9, wherein said index matching medium is ultraviolet glue.

11. A tapped optical fiber delay line as defined in claim 1, wherein the distance between successive ones of the bends of the first segments in said fiber is a constant length.

12. A tapped optical fiber delay line as defined in claim 1 wherein the form defines a curved configuration having a diameter sufficiently large to prevent severe bending and associated loss of light from the optical fiber, and wherein the raised portion comprises another form abutting the curved form and being of a diameter small enough to cause a severe bend in the optical fiber.

13. A tapped optical fiber delay line as defined in claim 1 further comprising:
means for summing the light emitted from the fiber; and
means for reducing the intensity of a portion of the light emitted from selected bends of the fiber, which light is being summed, said reduction causing a resulting frequency passband shape to be varied.

14. A tapped optical fiber delay line, comprising:
a form having at least one raised portion;
a length of optical fiber positioned on the form such than at least one segment of the fiber passes over the raised portion, so that a bend is formed in the fiber by force produced exclusively between the fiber and the raised portion, said bend being of sufficiently small radius to permit sampling, at said bend, of a light signal traveling in the fiber; and
means for detecting light sampled at the bend in the fiber.

15. A tapped optical fiber delay line as defined in claim 14 wherein the form defined a curved configuration having a diameter sufficiently large to prevent severe bending and associated loss of light from the optical fiber, and wherein the raised portion comprises another form abutting the curved form and being of a diameter small enough to cause a severe bend in the optical fiber.

16. A tapped optical fiber delay line as defined in claim 14 further comprising:
means for summing light emitted from plural bends in the fiber; and
means for reducing the intensity of a portion of the light emitted from selected bends of the fiber, which light is being summed, said reduction causing a resulting frequency passband shape to be varied.

17. A tapped optical fiber delay line, comprising:
a length of optical fiber wound around a form to provide plural loops, said form exerting a force on said fiber exclusively from the interior of said loops at selected plural locations along said fiber to form plural bends in said fiber at said selected plural locations, said bends of sufficiently small radius to cause light traveling within said fiber to be directed out of said fiber at said bends; and
means for detecting at least a portion of the light emitted from said fiber at said bends.

18. A tapped optical fiber delay line, as defined in claim 17 further comprising:
means for summing the light emitted from the fiber; and
means for reducing the intensity of a portion of the light emitted from selected bends of the fiber, which light is being summed, said reduction causing a resulting frequency passband shape to be varied.

19. A tapped optical fiber delay line, comprising:
an optical fiber for receiving a light signal; and
means for applying a force exclusively to one side of said optical fiber at plural locations along said fiber to form plural bends in said fiber at said plural locations, respectively, to cause light to be emitted from said fiber at said plural locations, said means for applying a force applying said force only to the side of the fiber opposite the side from which light is emitted.

20. A tapped optical fiber delay line, as defined in claims 14, 17, or 19, wherein said optical fiber comprises a single mode optical fiber.

21. A method of tapping an optical fiber delay line comprising the steps of:
providing a first form having a surface whose diameter is sufficiently large to prevent severe bending and associated loss of light from an optical fiber positioned thereon;
positioning a raised member on at least a portion of the surface of the first form;
wrapping a segment of an optical fiber around the form in a configuration such that at least a portion of said segment passes over the raised member so as to form a bend in the fiber of a radius sufficiently small to cause a portion of a light signal traveling in the fiber to be directed out of said fiber at the bend; and
positioning, adjacent the bend, a means of detecting the light emitted from the fiber at the bend.

22. A method of tapping an optical fiber delay line as defined in claim 21, further comprising the steps of:
positioning, adjacent selected detecting means, means for reducing intensity of at least a portion of the light emitted from the bends adjacent said selected detecting means, and
positioning a means for summing the light emitted from the fiber in alignment with the detecting means, so as to permit summing of the emitted light and production of a waveshape representative of a frequency passband.

23. A method of tapping an optical fiber delay line, as defined in claim 21, wherein said optical fiber comprises a single mode optical fiber.

24. A method of filtering an optical signal, comprising:
projecting a light signal into an optical fiber wound around a form, one portion of said form being configured so as to cause a bend in an adjacent portion of each revolution of said fiber at which point light is emitted;
summing the light emitted from said fiber; and
reducing the intensity of a portion of the light emitted from selected bends of said fiber, which light is being summed, said reduction causing a resulting frequency passband shape to be varied.

25. A method of filtering an optical signal, as defined by claim 24, wherein said optical fiber comprises a single-mode optical fiber.

26. A method of tapping light from an optical fiber, comprising:
projecting a light signal into an optical fiber; and applying a force exclusively to one side of said optical fiber at plural locations along said fiber to create plural bends in said fiber at said plural locations, respectively, to cause light to be emitted from said fiber at said plural locations.

27. A method of tapping light from an optical fiber, as defined by claim 26, wherein said optical fiber comprises a single mode optical fiber.

* * * * *